United States Patent Office 3,737,439
Patented June 5, 1973

3,737,439
2-PYRROLIDINE ACRYLAMIDE
Carolina Coronelli, Giangualberto Gallo, and Graziella Beretta, Milan, Italy, assignors to Gruppo Lepetit S.p.A., Milan, Italy
No Drawing. Filed Jan. 28, 1971, Ser. No. 110,755
Int. Cl. C07d 27/04
U.S. Cl. 260—326.3          1 Claim

ABSTRACT OF THE DISCLOSURE

A 1-pyrroline-2-acrylamide, which is suitable for use as an antibiotic (herein referred to as pyracrimycin A) is produced by cultivation of *Streptomyces eridani* n. Sp. ATCC 21619 and can be isolated from the fermentation medium by extraction. The antibiotic substance is active against various Gram positive and Gram negative bacteria. The dihydro derivative of 1-pyrroline-2-acrylamide is also disclosed.

BRIEF SUMMARY OF THE INVENTION

This invention is directed to novel compounds based on 1-pyrroline-2-acrylamide, which are particularly suitable for use as antibiotic substances and is inclusive of a method for preparing the same. 1-pyrroline-2-acrylamide (hereinafter referred to at times as pyracrimycin A) is a white crystalline substance having characteristic properties such as melting point, infrared and ultraviolet absorption spectra, proton magnetic resonance and mass spectra. On the basis of these data together with the elemental analysis and the molecular weight, 1-pyrroline-2-acrylamide can be assigned the following structural formula

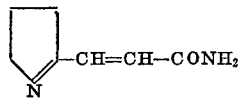

The pyracrimycin A form of 1-pyrroline-2-acrylamide can be prepared by cultivation of *Streptomyces eridani* n. Sp. ATCC 21619 in an aqueous medium and can be isolated from the medium together with another metabolite hereinafter referred to as pyracrimycin B which is another derivative of 1-pyrroline-2-acrylamide. The separation of pyracrimycin A from pyracrimycin B, which does not possess antibiotic activity, can be effected by treating the crude mixture of the two metabolites with hot chlorinated lower hydrocarbons of from 1 to about 4 carbon atoms such as, for instance, chloroform, in which pyracrimycin A is substantially insoluble.

In the preparation of pyracrimycin A the organism is cultivated under aerobic conditions in aqueous nutrient medium suitable for the growth of said organism, the medium containing a source of carbon, a source of nitrogen and inorganic salts. The cultivation is continued under conditions which favor the growth of the microorganism for a time sufficient to produce substantial antibiotic activity. For instance, a paper disc agar plate assay with *E. coli* may be used to control the antibiotic level. Pyracrimycin A thus produced can be isolated by conventional procedures such as removal of mycelium by filtration followed by extraction with an organic solvent in which the 1-pyrroline-2-acrylamide materials are soluble and which is immiscible with the aqueous medium. A crude mixture of pyracrimycin A and B may be obtained by adding a large excess of petroleum ether to the organic extract after having washed with alkaline water and concentrated the solution. The crude mixture of the two metabolites is then purified by suspending in methanol, filtering off the insoluble impurities concentrating the filtrate and chilling the solution until crystallization is complete. A separation of the two products is achieved according to the afore-mentioned treatment with a chlorinated organic solvent. The antibiotic substance of the invention is useful against Gram positive and Gram negative bacteria. The following Table I illustrates the antimicrobial activity of the separated 1-pyrroline-2-acrylamide identified as pyracrimycin A.

TABLE I

Antimicrobial activity of pyracrimycin A

| Microorganism-test: | Minimal inhibitory concentration, δ/ml. |
|---|---|
| *Staphylococcus aureus* 209 P | 20 |
| *Staphylococcus aureus* Tour | 20 |
| *Strepthococcus hemolyticus* C 203 | 20 |
| *Diplococcus pneumoniae* UC 41 | 10 |
| *Candida albicans* SKF 2270 | >100 |
| *Trichophyton mentagrophytes* SKF 17410 | >100 |
| *Mycobacterium tuberculosis* H 37 Rv ATCC 9360 | 10 |
| *Proteus vulgaris* X19 ATCC 881 | 10 |
| *Pseudomonas aeruginosa* ATCC 10145 | 50 |
| *Escherichia coli* SKF 12140 | 10 |
| *Escherichia coli* M. Leod ATCC 10536 | 20 |
| *Escherichia coli* M. Leod ATCC 10536-Caf/R | 20 |
| *Escherichia coli* M. Leod ATCC 10536-Tetra/R | 20 |
| *Escherichia coli* M. Leod ATCC 10536-Strepto/R | 10 |
| *Escherichia coli* M. Leod ATCC 10536-Neo/R | 10 |
| *Escherichia coli* M. Leod ATCC 10536-Kana/R | 10 |

One of the most important characteristics of this new antibiotic substance consists in the fact that in the in vitro tests practically no development of resistant strains is observed. This property is very significant where a topical application of an antibiotic substance is planned since in this case a widespread use of the substance has to be taken into consideration. The widespread use of an antibacterial substance may lead not only to emergence of resistant mutants within an individual patient but also to the spread of resistant strains. It is therefore evident that a substance which inhibits development of resistant strains offers undoubted advantages particularly when used for widely diffused topical applications. In our case, the antimicrobial substance of the invention may be easily compounded into ointments with the usual pharmaceutical carriers and binders such as lanolin, petrolatum, liquid petrolatum, water emulsifying and thickening agents. 1-pyrroline-2-acrylamide can be hydrogenated in lower alkanol solution, i.e. those having from 1 to about 4 carbon atoms, with metal borohydrides, particularly an alkali metal borohydride, such as, for instance, sodium borohydride to a dihydro derivative which on the basis of the physical data corresponds to the structure of 2-pyrrolidinacrylamide

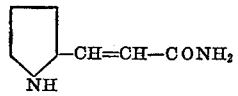

Also, this compound when prepared from pyracrimycin A is endowed with antimicrobial activity. In a representative in vitro test it inhibits the growth of *Escherichia coli* strains at a concentration of 50 γ/ml.

DETAILED DESCRIPTION OF THE INVENTION (1) Description of *Streptomyces eridani* n. Sp. ATCC 21610 *Streptomyces eridani* may be grown on a variety of standard media according to Gottlieb and Shirling: Int. Journal of Systematic Bacteriology 16, 313, 1966. Some other media may also be useful as it appears from Table II which reports the cultural and physiological characteristics of the producing strain.

The most convenient temperature for development of the colonies ranges from about 20° to about 45° C. and more particularly from about 28° to about 37° C.

stantial antibiotic activity is present in the same medium. As an example, a vegetative medium for shake flask culture may have the following composition in gr./l.

| | |
|---|---|
| Beef extract | 5 |
| Yeast extract | 5 |
| Peptone | 5 |
| Enzymatic casein hydrolysate | 3 |
| Dextrose | 20 |
| Sodium chloride | 1.5 |
| Tap water q.s. to 1000 ml. | |

The flasks are shaken for about 48–50 hours at a tem-

TABLE II

Cultural and physiological characteristics of *Streptomyces eridani* n. Sp. ATCC 21619

| Culture medium | Vegetative mycelium | Aerial mycelium | Soluble pigment | Physiological characteristics |
|---|---|---|---|---|
| Oat meal agar | Good growth, smooth surface, cream. | Whitish in traces | Cream to light amber | |
| Medium n. 2 (Gottlieb and Shirling) | Good growth, slightly wrinkled, amber. | Absent | Amber brown | |
| Oat meal agar (Medium n. 3 Gottlieb and Shirling). | Moderate growth, smooth surface, hyaline. | White, velvety, not much abundant. | Absent | |
| Glycerol asparagine agar (Medium n. 5 Gottlieb and Shirling). | Growth good, smooth surface, cream. | Absent | do | |
| Hickey and Tresner's agar | Good growth, slightly wrinkled, brown. | do | Deep amber brown | |
| Bennett's agar | Good growth, wrinkled surface, amber brown. | do | Amber brown | |
| Czapek glucose agar | Moderate growth, smooth surface, straw. | do | Absent | |
| Glucose asparagine agar | Good growth, smooth surface with wax aspect, cream. | do | Traces, cream | |
| Nutrient agar | Growth scarce, thin smooth surface, amber. | do | Amber | |
| Potato agar | Good growth, slightly wrinkled surface, light brown. | Whitish in traces | Light brown | |
| Starch agar (Medium n. 4 Gottlieb and Shirling). | Moderate sgrowth, smooth surface, traw. | Absent | Straw | Good hydrolysis. |
| Pepton-yeast extract iron agar (Medium n. 6 Gottlieb and Shirling). | Moderate growth, smooth surface, brown. | do | | Production of $H_2S$. |
| Tyrosine agar (Medium n. 7 Gottlieb and Shirling). | Good growth, wrinkled surface, black-brown. | do | Black-brown at the edges of the growth, brown in the medium. | Tyrosinase reaction positive, strong production of melanoid pigment. |
| Ca malate agar | Good growth, smooth surface, straw. | do | Absent | Strong digestion of Ca malate. |
| Gelatin | | | do | Liquefaction. |
| Nitrate broth | | | Dark brown | Nitrate reduction. |
| Litmus milk | Brown ring | | Absent | No peptonization, no coagulation. |
| Skim milk agar | Good growth, smooth surface. | Absent | Brown, not very soluble in the medium. | No hydrolysis of casein. |

Aerial mycelium is produced by *S. eridani* only on oat meal and potato agar. On the latter the aerial mycelium produced is scanty and no sporulation is observed; on oat meal agar the aerial mycelium is white velvety with long flexous and branched hyphae having a diameter of about $1.3\mu$. The aerial hyphae produce sporophores in fairly closed spirals different in their lengths. The spores have diameters of about $1-1.3\mu \times 1.3-1.6\mu$. The following Table III reports the test for utilization of carbon sources according to Pridham and Gottlieb: Journal Bacteriology 56: 107, 1948.

TABLE III

Utilization of carbon compounds by *Streptomyces eridani* n. Sp. ATCC 21619

| Carbon source: | Growth |
|---|---|
| Sucrose | ++ |
| Xylose | ++ |
| Arabinose | ++ |
| Inositol | ++ |
| Raffinose | ++ |
| Mannitol | ++ |
| Fructose | ++ |
| Rhamnose | ++ |
| Cellulose | — |
| Glucose (positive control) | ++ |

++ Strongly positive utilization.
— No utilization.

Production and properties of 1-pyrroline-2-acrylamide (pyracrimycin A)

For producing the invention antibiotic substance the strain *Streptomyces eridani* n. Sp. ATCC 21619 is aerobically cultivated in an aqueous nutrient medium until subperature of about 28–30° C. on a reciprocating shaker. Such a culture is used as an inoculum to be added to the vegetative medium of the fermentors. To this purpose, in a fermentor, 4 l. of a medium having the following composition in gr./l.

| | |
|---|---|
| Beef extract | 4 |
| Peptone | 4 |
| NaCl | 2.5 |
| Yeast extract | 1 |
| Soybean meal | 10 |
| Dextrose | 20 |
| $CaCO_3$ | 5 |
| Water q.s. to 1000 ml. | | is inoculated with an 8% of the shake flask culture and maintained under agitation of 800 r.p.m. and aeration of 1./v./v./min. for about 24 hours at a temperature of about 28–30° C. The further fermentation operations are carried out in fermentors containing 10 l. of a medium having practically the same composition as above with 50 gr./l. of dextrose. Said medium is inoculated with 1 liter of the above vegetative medium culture and is maintained at about 28–30° C. under agitation of 800 r.p.m. and aeration of 1./v./v./min. At intervals the antibiotic activity is assayed on paper disc agar plate using *E. coli* as test microorganism. The maximum activity is reached after 48 hours of fermentation. The fermented broth is filtered with the aid of 2% Hyflo-Super Cel and the mycelial cake is discarded. The filtrate, after the addition of 20% of NaCl is extracted twice with one-half its volume of butanol, the combined extracts are washed with small volume of slightly alkaline water and concentrated to one fifth of the original vo'ume. A precipitation of inorganic salts, containing less than 1% of the pyracrimycins is obtained by cooling a few hours at 4° C. the concentrated solvents; the salts are filtered off and the solution concentrated again to a small volume. A crude mixture of pyracrimycin A and B is obtained by adding a large excess of petroleum ether to the concentrated extracts. The crude material has about 30–35% purity, pyracrimycin A and B being present in roughly one to one proportion. The product is suspended in hot methanol (10 grs., 500 ml.) and filtered from insoluble matter. The solution is treated with charcoal to remove impurities, concentrated until crystallization starts and chilled until crystallization is complete; both metabolites crystallize in mixture giving a product with about 95% total purity. A separation of the two metabolites is achieved by treatment of the product with chloroform on water bath for one hour. Pyracrimycin A, containing only 1–2% of B, is collected and pyracrimycin B crystallizes after concentration of the chloroform solution to a small volume. A final crystallization from methanol gives the pure product.

Pyracrimycin A is a white crystalline substance, M.P. 215–216° C. The product resulted to be unitary on paper and thin layer chromatography; the Rf values obtained with different solvent systems are reported in Table IV.

TABLE IV

Chromatographic behavior of pyracrimycin A

| Solvent system: | Rf value |
|---|---|
| Water saturated butanol | 0.60 |
| Water saturated butanol+2 percent p-toluenesulfonic acid | 0.29 |
| Water saturated butanol+2 percent of ammonia | 0.53 |
| Butanol saturated water | 0.14 |
| 20 percent ammonium chloride | 0.71 |
| Butanol:methanol:water 40:10:20+1.07 g. percent of methylorange | 0.65 |
| Butanol:methanol:water 40:10:30 | 0.71 |
| Water:acetone 1:1 | 0.52 |
| Water saturated ethyl acetate | 0.00 |
| Chloroform:methanol 9:1 (TLC) | 0.22 |

Paper chromatography on Wh. 1, antibiotic visualized on agar plates seeded with *S. aureus*.

TLC on silica gel plates, spot detected under UV light.

The found microanalytical data C, 60.99%; H, 7.50%; N, 20.20% are consistent for the molecular formula $C_7H_{10}N_2O$ (theoretical values: C, 60.85%; H, 7.30%; N, 20.27%) with a molecular weight 138.17. The product has slightly basic character, is almost insoluble in the common organic solvents, with the exception of dimethylsulfoxide and dimethylformamide and slightly soluble in dilute acids, methanol and lower alkanols.

The infrared spectrum in mineral oils shows characteristic bands at 3250, 3050, 1670, 1620, 1590, and 972 cm.$^{-1}$ which are consistent with the assigned structure 1-pyrroline-2-acrylamide. The U.V. spectrum in methanol solution shows a maximum at 235 m$\mu$ ($\epsilon$ 22,000).

Potentiometric titration in a 1:4 mixture of water and methylcellosolve with 0.1 N hydrochloric acid shows a basic ionizable function having a pK value of 5.4.

The proton magnetic resonance spectrum in DMSO-d$_6$ solution is recorded with a Varian A-60 spectrometer at 60 megacycles in the customary manner using tetramethylsilane as internal standard. The principal characteristic absorption peaks occur at the following frequencies expressed in $\delta$ units 1.87 (multiplet), 2.67 and 3.90 (two triplets), 6.44 and 7.16 (two doublets).

The mass spectrum of pyracrimycin A is recorded with a mass spectrometer Hitachi-Perkin Elmer RMU-6L and confirms the molecular weight 138.17 by the M$^+$ peak at 138 $m/e$ units.

Preparation and properties of 2-pyrrolidinacrylamide (Dihydropyracrimycin A)

To a solution of 0.5 gram of pyracrimycin A in 300 ml. of dry ethanol cooled on ice-bath, 0.25 gram of sodium borohydride are added. The solution is kept at about 4° C. for two hours and at room temperature for 12 hours under stirring. After decomposing the excess of NaBH$_4$ with 10% HCl, the ethanol solution is diluted with water and then evaporated, under reduced pressure. The residual aqueous solution after alkalization with 10% sodium carbonate is thoroughly extracted with ethyl acetate. The extracts, after anhydrification and concentration to dryness, give 0.1 gram of a highly hygroscopic product which is dihydropyracrimycin A. The compound shows the following properties:

Analysis for $C_7H_{12}N_2O$ (percent): Found C, 59.45; H, 8.80; N, 19.60. Calculated C, 59.98; H, 8.63; N, 19.98.

Molecular weight confirmed by mass spectrum: 149.19. Thin-layer chromatography on silica gel plate Rf=0.6 (ethyl acetate:acetic acid:water 3:1:1).

Characteristic band of infrared spectrum in Nujol expressed in cm.$^{-1}$: 3300, 3130, 1680, 1620, 990.

Potentiometric titration in water with 0.1 N HCl gives a pK value of 9.4.

The P.M.R. spectrum in DMSO-d$_6$ shows the following significant peaks expressed in $\delta$ units which confirm the reduction of the carbon-nitrogen double bond in the 2-pyrroline moiety: 5.92 (doublet); 6.55 (doublet of doublets).

We claim:
1. An antibiotically active 2-pyrrolidin-acrylamide compound characterized by the following properties:
 (a) molecular weight 149.19,
 (b) characteristic absorption in the infrared region at 3300, 3130, 1680, 1620 and 990 cm.$^{-1}$,
 (c) a proton resonance spectrum with principal characteristic absorption peaks at the following frequencies expressed in $\delta$ units, 5.92 (doublet), 6.55 (doublet of doublets), and
 (d) containing the elements carbon, hydrogen, and nitrogen in substantially the following proportions by weight: carbon 59.5 percent, hydrogen 8.8 percent and nitrogen 19.6 percent.

References Cited

UNITED STATES PATENTS 3,364,115   1/1968   Mason et al. _____ 424—121

ALEX MAZEL, Primary Examiner

J. A. NARCAVAGE, Assistant Examiner

U.S. Cl. X.R.

195—80; 424—274

UNITED STATES PATENT OFFICE
CERTIFICATE OF CORRECTION

Patent No. 3,737,439          Dated June 8, 1973

Inventor(s) Carolina Coronelli, Giangualberto Gallo and Graziella Beretta

It is certified that error appears in the above-identified patent and that said Letters Patent are hereby corrected as shown below:

Column 1, line 26, delete "pyrroline" and substitute --Pyrroline--.

Column 2, line 14, delete "$\delta$" and substitute --$\gamma$--.

Column 3, line 3, delete "21610" and substitute --21619--.

Table II, line 24, delete "traw" and substitute --straw--.

Signed and sealed this 1st day of January 1974.

(SEAL)
Attest:

EDWARD M. FLETCHER, JR.
Attesting Officer

RENE D. TEGTMEYER
Acting Commissioner of Patents